United States Patent [19]

Nako et al.

[11] Patent Number: 4,981,886

[45] Date of Patent: Jan. 1, 1991

[54] METHOD FOR PRODUCTION OF COLORED MACROMOLECULAR POLYMER

[75] Inventors: Yukimichi Nako, Tsukuba; Kyoji Kaeriyama, Tsuchiura; Aizo Yamauchi, Tsukuba, all of Japan

[73] Assignees: Agency of Industrial Science Technology; Ministry of International Trade & Industry, both of Tokyo, Japan

[21] Appl. No.: 262,587

[22] Filed: Oct. 26, 1988

[30] Foreign Application Priority Data

Oct. 26, 1987 [JP] Japan ................................ 62-269890

[51] Int. Cl.$^5$ ......................... C08L 63/00; C08K 3/18; C08K 3/10; C08K 3/08
[52] U.S. Cl. ................................. 523/454; 523/458; 523/459; 524/780; 524/785
[58] Field of Search ................ 524/780, 785; 523/454, 523/458, 459

[56] References Cited

U.S. PATENT DOCUMENTS

| | | | |
|---|---|---|---|
| 1,705,264 | 3/1929 | Ostromislensky | 524/780 |
| 4,061,609 | 12/1977 | Bobear | 524/780 |
| 4,548,984 | 10/1985 | Misura | 524/780 |

FOREIGN PATENT DOCUMENTS

| | | | |
|---|---|---|---|
| 59-49202 | 3/1984 | Japan | 524/780 |
| 60-178401 | 9/1985 | Japan | 524/780 |
| 125885 | 2/1959 | U.S.S.R. | 524/780 |

*Primary Examiner*—C. Warren Ivy
*Attorney, Agent, or Firm*—Oblon, Spivak, McClelland, Maier & Neustadt

[57] ABSTRACT

A colored macromolecular polymer is produced by a method which comprises dissolving a soluble salt of a noble metal in a liquid monomer, polymerizing the monomer having the soluble salt of the noble metal dissolved therein, and subjecting the resultant solid polymer to a heat treatment at a temperature equal to or exceeding the colloid-forming temperature of the noble metal.

2 Claims, No Drawings

METHOD FOR PRODUCTION OF COLORED MACROMOLECULAR POLYMER

BACKGROUND OF THE INVENTION

1. Field of the Invention

This invention relates to a novel method for the production of a colored macromolecular polymer. More particularly, this invention relates to a method for the production of a novel colored macromolecular polymer advantageously used as decorative organic plate glass, optical filter, and light shielding material in such fields as concerned with buildings, optical machines and tools, electrical appliances, and sundry goods.

2. Prior Art Statement

Heretofore, such macromolecular polymers as acrylic resin have been used often in a colored state. Their coloration has been generally attained by incorporation of organic dyes or pigments. When the macromolecular polymers colored by this method are used, particularly outdoors, they are inevitably discolored gradually on exposure to sunlight. This trend is particularly conspicuous when the coloration is red.

It is known that a finely divided metal powder absorbs light peculiar thereto. By virtue of this phenomenon, ceramic ware and glass ware are colored ["Colloid Chemistry", translated under supervision of Bunichi Tamamushi and published by Baifukan, page 398]. This coloration is attained by melting a salt of a given metal in combination with glass and subjecting the molten mixture to a reducing treatment or a reheating treatment. The product of this method has a red color when a gold salt or a copper salt is used or a red to yellowish brown color when a silver salt is used. The color tone assumed by the product depends on the finely divided metal powder contained therein and does not fade even after protracted exposure to sunlight.

As a way of dispersing a finely divided metal powder in a macromolecular polymer, a method which comprises reducing a noble metal salt into a corresponding metal colloid, displacing a dispersion medium of said colloid with a monomer, and polymerizing the resultant mixture (Japanese Patent Public Disclosure SHO 61(1986)-133202) has been known to the art. This method, however, is applicable only to rhodium, ruthenium, palladium, and platinum. Moreover, when the monomer used therein produces a macromolecular polymer, the product assumes a blackish brown to nearly black color and cannot be made to assume any other color. No method been known to the art which is available for effective dispersion of a finely divided powder of gold or silver as the source of a red or yellow color in a macromolecular polymer.

The present invention has been completed for the purpose of providing a method which permits a finely divided powder of such a noble metal as gold or silver in a macromolecular polymer and easily produces a colored macromolecular polymer safe from discoloration on exposure to sunlight.

OBJECT AND SUMMARY OF THE INVENTION

The inventors continued a study in search of a method for coloring a macromolecular polymer by having a finely divided powder of such a noble metal as gold or silver dispersed in the macromolecular polymer. They have consequently found that the object mentioned above is accomplished by dissolving a soluble salt of the noble metal in a liquid monomer, polymerizing the monomer thereby forming a solid macromolecular polymer, and subjecting this solid macromolecular polymer to a heat treatment at a specific temperature thereby giving rise to a finely divided powder of the noble metal in the macromolecular polymer. This invention has been perfected based on this knowledge.

To be specific, this invention provides a method for the production of a colored macromolecular polymer, characterized by the steps of dissolving a soluble salt of a noble metal in a liquid monomer, polymerizing the monomer containing the dissolved soluble salt thereby forming a solid polymer, and subsequently subjecting the solid polymer to a heat treatment at a temperature exceeding the colloid-forming temperature of the noble metal.

DETAILED DESCRIPTION OF THE PREFERRED EMBODIMENTS

The noble metal salt to be used in the method of this invention is of a type which dissolves in the monomer, is not reduced during the polymerization, undergoes a reduction caused by the heat treatment subsequent to the polymerization, and consequently forms a metal colloid. Noble metal salts answering this description include acid and alkali metal salts of noble metal ion halogen complexes and acetylacetonate salts of noble metal ions. As concrete examples of these noble metal salts, chloroauric acid (III), sodium tetrachloropalladate (II), and acetylacetonates of palladium (II) and platinum (II) may be mentioned. Further, ion pairs of noble metal anion complexes and quaternary ammonium ion such as, for example, ion pairs of tetrachlorogold (III) ion or dicyano silver (I) ion and stearyltrimethylammonium ion are available.

These noble metal salts may be used either singly or in the form of a mixture of two or more members. The amount of the noble metal salt is generally in the range of 0.001 to 10% by weight, based on the amount of the monomer. This range is critical because the color desired to be produced is not obtained or the color produced is pale, if the amount of the noble metal salt does not reach 0.001% by weight and the metal salt does not dissolve in a monomer if the amount exceeds 10% by weight.

As examples of the liquid monomer to be used in the method of the present invention, there may be mentioned monomers such as methyl methacrylate, styrene, and vinyl acetate, dienes such as isoprene and chloroprene, cyclic compounds such as epoxy compounds, and diisocyanates.

Typical relations between the colored macromolecular polymers produced from a monomer and various noble metal soluble salts and the colors of the polymers (except those demonstrated in the working examples).

| Monomer | Soluble salt | Color of polymer |
| --- | --- | --- |
| MMA | Ag-CN18 | yellow |
| MMA | platinum (II) acetylacetonate | dark brown |
| MMA | rhodium (III) acetylacetonate | dark brown |
| methyl acrylate | palladium (II) acetylacetonate | dark brown |
| n-butyl methacrylate | Au-P16 | red violet |
| mixture of 80% of MMA and 20% | palladium (II) acetylacetonate | dark brown |

| Monomer | Soluble salt | Color of polymer |
| --- | --- | --- |
| of styrene | | |

Now, the present invention will be described below with reference to one preferred embodiment. First, a soluble salt of a noble metal is dissolved in a prescribed proportion in a liquid monomer. This dissolution is generally carried out at normal room temperature. When the metal salt possesses low solubility, the dissolution may be carried out at an elevated temperature not exceeding the boiling point of the monomer.

Then, the monomer in which the noble metal salt has been dissolved is polymerized under conditions generally adopted for the polymerization of this monomer, preferably at an elevated temperature not exceeding 100° C. or the boiling point of the monomer, to obtain a solid polymer. In this polymerization, a polymerization initiator and a catalyst may be used as desired. Throughout the entire course of the polymerization, the noble metal salt retains its dissolved state and is not crystallized or reduced into noble metal particles.

Subsequently, the solid polymer consequently obtained as containing the dispersed noble metal salt is subjected to a heat treatment at a temperature equal to or exceeding the colloid-forming temperature of the noble metal, generally equal to or exceeding 120° C., and not higher than the melting point of the polymer, to induce formation of a colloid of the noble metal. During the course of this heat treatment, the polymer generally gains in color tone with the lapse of the time. Desirably this heat treatment is continued until the coloration ceases to proceed any further. The time required for this heat treatment is generally within one hour, though it is variable with the temperature of the heat treatment and the particular kinds of the noble metal salt and the polymer.

The colored macromolecular polymer which is obtained by the method of this invention enjoys outstanding properties such as transparency, clear color tone in red, yellow, brown, etc., and stability against discoloration during protracted exposure to sunlight outdoors.

The colored macromolecular polymer can be used advantageously as decorative organic plate glass, optical filter glass, and light-shielding material in various fields concerned with buildings, optical machines and tools, electrical appliances, and sundry goods.

Now, this invention will be described more specifically below with reference to working examples. It should be noted, however, that this invention is not restricted in any way by these examples.

EXAMPLE 1

Into 50 ml of an aqueous solution containing 1 m.mol of chloroauric (III) acid, 50 ml of an aqueous solution containing 1 m.mol of cetylpyridinium chloride was pured in as kept stirred. The resultant mixture was filtered to separate the formed precipitate. The residue of the filtration was recrystallized with chloroform, to obtain yellow scaly tetrachlorogold (III)-cetylpyridinium ion pair (Au-P16). Separately, 3.00 g of methyl methatrylate (MMA) purified by distillation under normal pressure was weighed out in a test tube of polypropylene having an inner volume of 10 ml. In the MMA held in the test tube, 0.97 mg of the aforementioned Au-P16 and 15 mg of benzoyl peroxide were dissolved. In this case, the proportion of the Au-P16 to the MMA was 0.032% by weight. The resultant solution was heated over an oil bath at 60° C. for six hours to polymerize the MMA, to produce a solid, substantially colorless transparent polymethyl methacrylate (PMMA). When this solid polymer was further heated over an oil bath at 140° C. for one hour, there was obtained a red transparent PMMA.

EXAMPLE 2

In a refrigerator, 50 ml of an aqueous solution containing 1 m.mol of potassium dicyano silver (I) and 50 ml of an aqueous solution containing 1 m.mol of stearyl trimethyl ammonium chloride were jointly left standing for one dry. The resultant mixture was filtered to separate the turmed precipitate. The residue of the filtration was dried to form a colorless finely divided dicyano-silver (I)-stearyltrimethylammonium ion pair (Ag-CN18).

In a total of 1.04 g of A-B mixture of a commercially available epoxy adhesive agent of an epoxy resin component (A) and a polythiol component (B), each having a viscosity of 50,000 cps at 25° C. and specific gravities of 1.17 and 1.15, respectively [produced by Koniski K.K. and marketed under the tradename "Bond Quick Set (A, B)"], 1.3 mg of the Ag-CN18 was dissolved. In this case, the proportion of the Ag-CN18 to the A-B mixture was 0.13% by weight. When the resultant solution was heated over an oil bath at 60° C. for one hour, there was obtained a slightly yellowish transparent solid epoxy resin. When this solid resin was further heated over an oil both at 140° C. for one hour, there was produced a yellowish brown transparent epoxy resin.

EXAMPLE 3

A darkish brown transparent PMMA was obtained by following the procedure of Example 1, except that 0.46 mg of parladium (II) acetylacetonate purified by recrystallization from acetone was used in the place of Au-P16.

What is claimed is:
1. A method for the production of a colored macromolecular polymer, which consists essentially of:
    dissolving in a monomer selected from the group consisting of methyl methacrylate, styrene, vinyl acetate, a diene and an epoxy compound, each of which is liquid at room temperature, 0.001 to 10% by weight, based on the amount of said monomer, of at least one soluble salt selected from the group consisting of alkali metal salts of noble metal ion halogen complexes, acetylacetonate slats of noble metal ions and ion pairs of noble metal anion complexes with quaternary ammonium ions;
    heating the noble metal salt containing monomer to a temperature not exceeding 100° C. or the boiling point of the monomer to prepare a polymerized product containing the noble metal salt dispersed therein, said noble metal sail not being capable of being reduced at the temperatures of polymerization; and
    heat-treating the polymerized product containing the noble metal salt dispersed therein to a temperature of at least 120° C. but at a temperature not exceeding the melting point of the polymerized product, thereby causing reduction of the dispersed noble metal salt and giving rise to a nobel metal colloid within the heat-treated product.
2. The method of claim 1, wherein said epoxy compound is an epoxy adhesive agent.

* * * * *

UNITED STATES PATENT AND TRADEMARK OFFICE
CERTIFICATE OF CORRECTION

PATENT NO. : 4,981,886

DATED : January 1, 1991

INVENTOR(S) : Yukimichi Nakao et al.

It is certified that error appears in the above-identified patent and that said Letters Patent is hereby corrected as shown below:

Title page: Item [19] should read -- Nakao, et. al--.
   The first inventor's name is incorrect, should be, -- Yukimichi Nakao-- and the assignee is incorrect, should be, -- Agency of Industrial Science & Technology, Ministry of International Trade & Industry, Tokyo, Japan--.

Signed and Sealed this

Fifteenth Day of December, 1992

*Attest:*

DOUGLAS B. COMER

*Attesting Officer*     *Acting Commissioner of Patents and Trademarks*